United States Patent [19]

Quilici

[11] 4,193,479
[45] Mar. 18, 1980

[54] BRAKING ARRANGEMENT AND BRAKE, PARTICULARLY FOR TWO-WHEELED VEHICLES

[75] Inventor: Jean-François Quilici, Saint Cloud, France

[73] Assignee: Renault Moteurs Developpement, Boulogne-Billancourt, France

[21] Appl. No.: 860,482

[22] Filed: Dec. 14, 1977

[30] Foreign Application Priority Data

Dec. 14, 1976 [FR] France .................. 76 37582

[51] Int. Cl.² ........................................... B60T 1/06
[52] U.S. Cl. ........................ 188/2 A; 188/26; 188/71.1; 188/72.7; 188/72.9; 188/344
[58] Field of Search .................. 188/2 A, 71.1, 72.1, 188/72.2, 72.4, 72.5, 72.7, 72.9, 26, 70 R, 70 B, 18 A, 344, 346

[56] References Cited

U.S. PATENT DOCUMENTS

| | | | |
|---|---|---|---|
| 526,317 | 9/1894 | Hendrick et al. | 188/26 |
| 1,674,751 | 6/1928 | Luettwitz | 188/26 X |
| 2,917,135 | 12/1959 | Hirzel | 188/71.1 X |
| 2,979,164 | 4/1961 | Altherr | 188/72.7 X |
| 3,285,372 | 11/1966 | Rossmann | 188/72.2 |
| 3,554,334 | 1/1971 | Shimano | 188/344 |

FOREIGN PATENT DOCUMENTS

| | | | |
|---|---|---|---|
| 1205023 | 8/1959 | France | 188/346 |
| 2095048 | 2/1972 | France | 188/72.5 |
| 2118208 | 7/1972 | France | 188/345 |

*Primary Examiner*—George E. A. Halvosa
*Attorney, Agent, or Firm*—Oblon, Fisher, Spivak, McClelland & Maier

[57] ABSTRACT

The arrangement for coordinated braking of the two wheels disposed in tandem on a vehicle includes in combination a first brake with friction linings situated at a fixed distance from the axis of rotation of the corresponding wheel, a second disk brake the friction pads of which are situated at a variable distance from the axis of rotation of the disk and a mechanism permitting the variation of the distance simultaneously with the clamping of the pads of the second brake against the disk.

4 Claims, 8 Drawing Figures

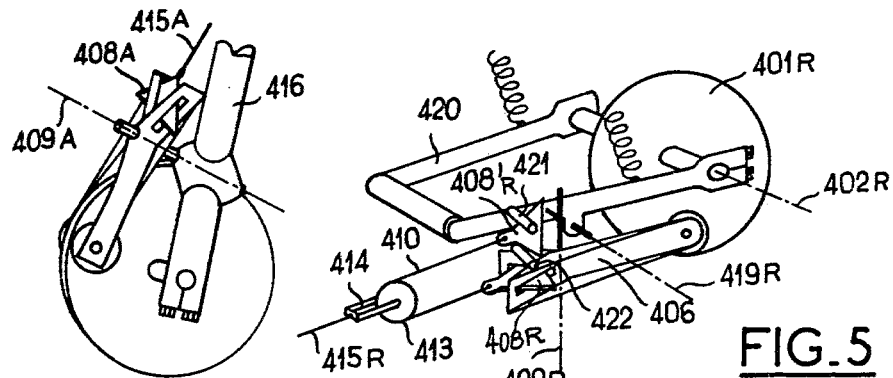
FIG.6   FIG.5
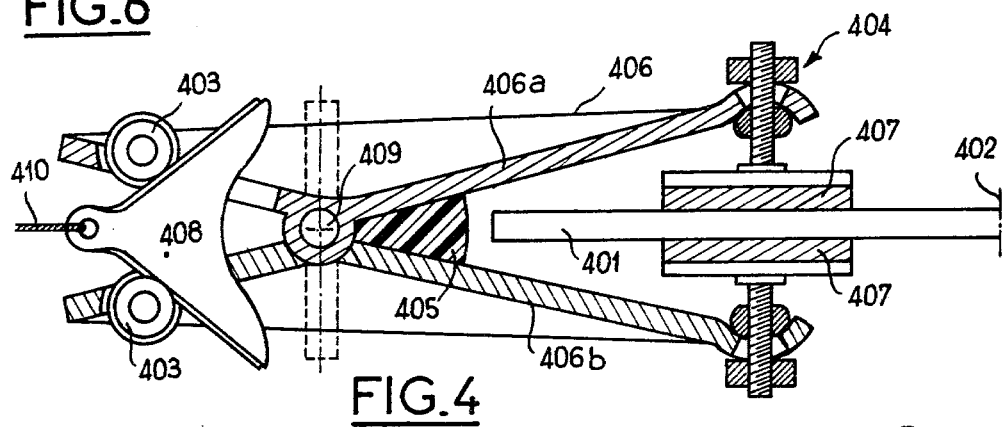
FIG.4
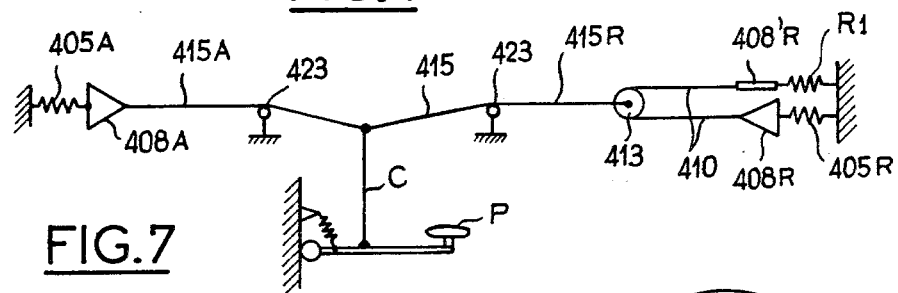
FIG.7
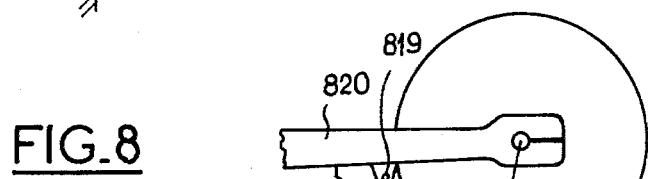
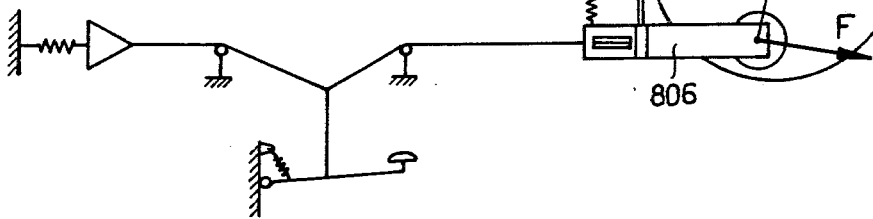
FIG.8

BRAKING ARRANGEMENT AND BRAKE, PARTICULARLY FOR TWO-WHEELED VEHICLES

BACKGROUND OF THE INVENTION

1. Field of the Invention

The invention concerns a braking arrangement for disk brakes of the type comprising a disk integral with each wheel of the vehicle, two friction pads on opposite sides of the disk, a mechanism for controlling the clamping of the disk between the friction pads and a mechanism for fastening the support of the pads to an element of the vehicle frame.

2. Description of the Prior Art

It is known that the braking forces or maximum "drags" on the two wheels, front and rear, of a vehicle are given by the relations:

for the front wheel: $T_1 = P_1\mu + P\mu^2 H/E$
for the rear wheel: $T_2 = P_2\mu - P\mu^2 H/E$ where $\mu$ is the coefficient of friction with the road $P_1$, $P_2$ are the loads on the front and rear hubs P is the vehicle weight.

H is the distance of the center of gravity from the road

E is the wheelbase.

The graphical representation of these forces is a parabola in a system of perpendicular axes $T_1$, $T_2$. It is seen then that, as a general thing, the transferred load entering into the front and rear drags, multiplied by the square of the coefficient of friction, obliges the rider to reduce the braking applied to the rear wheel considerably in order to avoid locking this wheel up.

In contrast to the automobile, a two-wheeled vehicle is unstable in roll when the front wheel slips. If the braking force is applied simultaneously to the front and rear wheels it is well to have the braking force on the rear wheel predominate slightly. In effect, even when the rear wheel is locked it is still possible to steer the vehicle so as to avoid falling over sideways (rolling) and/or swerving in traverse (yawing).

SUMMARY OF THE INVENTION

The object of the invention is a braking arrangement for the front and rear wheels of a vehicle with at least two wheels, the mode of realization of which assures a parabolic distribution, rather than the linear one of the conventional approach, of the braking forces on the wheels.

The invention likewise has as its object the braking of the front and rear wheels which assures a permanent predominance, although always weak, of the rear braking force in a two-wheeled vehicle.

The invention further has for its object an open-loop braking arrangement in contrast to feedback-loop arrangements currently used in automotive technology which utilize limiters or braking pressure distributors sensitive to the load on the rear axle.

The invention likewise has as its object a disk brake the means of which for fastening the friction pad holder to an element of the vehicle frame are associated with the means for controlling the radial displacement of the pad holder.

According to a first mode of realization, the caliper holding the friction pads is mounted so as to pivot about an axis parallel to the axis of rotation of the wheel and disk. The relative locations of the caliper pivot and the pads allows the latter to move towards the disk axis against the opposing force of a spring. When necessary a control piston subjected to the braking pressure is used to adjust the angular displacement of the said caliper with respect to the axis of rotation of the disk as a function of the braking control pressure.

In a second mode of realization, the support for the friction linings contacts a cam for controlling the tilt of the said support about an axis parallel to the axis of rotation of the wheel. In this way is realized a disk brake for the rear wheel of a two-wheeled vehicle, the radius of action of the pads of which diminishes as the braking force increases.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 4 represents a second embodiment of the brake of the present invention.

FIGS. 5 and 6 relate to the mounting of the brake of FIG. 4 on the front and rear wheels of the two-wheeled vehicle.

FIG. 7 is a schematic diagram of the kinematics of the braking system utilizing the brake embodiments shown in FIGS. 5 and 6.

FIG. 8 is a modified schematic diagram of the kinematics of the braking system of FIG. 7.

DETAILED DESCRIPTION OF THE PREFERRED EMBODIMENTS

Figure 1:
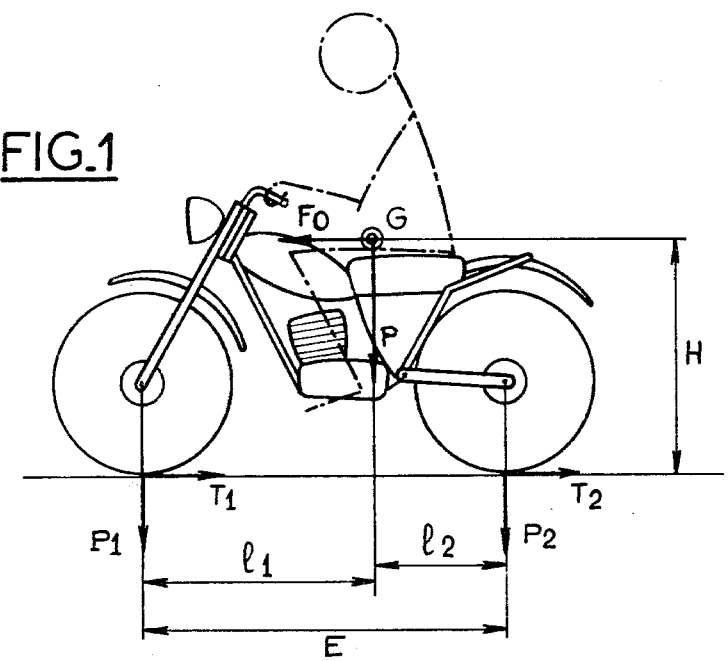
FIG. 1 is a schematic drawing of the vehicle.
Figure 2:
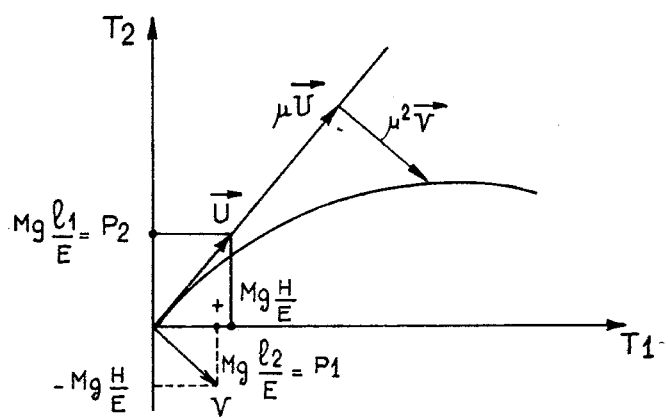
FIG. 2 is a graphical representation of the distribution of slowing forces applied to the two wheels.

In FIG. 1 the two-wheeled vehicle has a wheelbase E and its weight P is applied at the center of gravity G of the vehicle. The weight P divides at the road surface into two loads $P_1$ and $P_2$ applied to the front and rear wheels, respectively. At the moment of braking there appears a longitudinal inertia force $F_o$ applied at the center of gravity G of the vehicle, the height of which above the road is H. This inertia force, directed in the sense of motion, gives rise to a pitching moment $F_oH$ which manifests itself as a transfer of load from the rear to the front wheel. It can be shown that the forces or "drags" applied to the hubs of the two wheels, when locked, are:

at the front wheel: $T_1 = P_1\mu + P\mu^2 H/E$
at the rear wheel: $T_2 = P_2\mu - P\mu^2 H/E$ The graphical representation of the retarding forces is a parabola as shown in FIG. 2 where $T_2$ is a function of $T_1$. This parabola can be defined vectorially in the $T_1$ and $T_2$ axes by noting first that if the load transfer did not occur, $T_1 = P_1\mu$ and $T_2 = P_2\mu$ would be the components along the $T_1$, $T_2$ axes of a vector $\mu \vec{U}$, $\vec{U}$ being simply the weight of the vehicle divided into $P_1$ on the front wheel and $P_2$ on the rear.

If there is now considered a second vector $\vec{V}$ with components $+P H/E$ and $-P H/E$ (corresponding to a transfer of load), it is found that the maximum braking forces are the projections on the $T_1$ and $T_2$ axes of the vector sum $\mu(\vec{U}+\mu\vec{V})$ or $\mu\vec{U}+\mu^2\vec{V}$.

The basic idea of the invention is to vary the braking couple exerted by the linings on the brake disk in proportion to the slowing forces by reducing the radius of action R of the pads in proportion to the force p exerted on the brake control lever (pedal, hand lever, etc.) according to the relation $R=R_o-ap$, $R_o$ being the radius of the disk and (a) a constant.

If $\mu'$ denotes the coefficient of friction of the pads against the disk, the braking couple is of the form $2\mu'RF$, F being the force exerted on each pad. If F is proportional to the brake lever force p, $F=Kp$ and the braking couple is of the form $M_R=2\mu'RKp$ or $M_R=\mu'K(R_op-ap^2)$, which corresponds indeed to a quadratic variation of the braking couple. It must be remembered that this law of variation corresponds to that for the force $T_2$.

Figure 3:
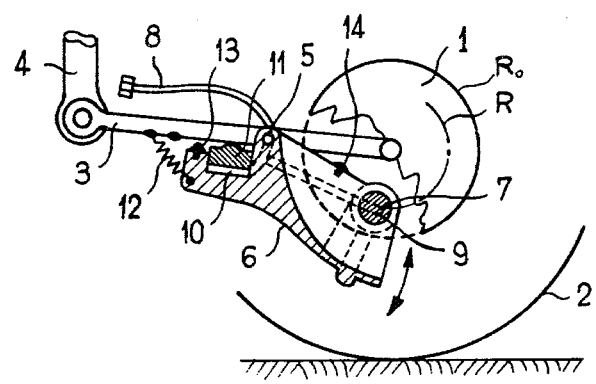
FIG. 3 illustrates a first embodiment of the brake of the present invention.

An example of the brake will now be described with respect of FIG. 3. This brake comprises a disk 1 attached to a wheel 2 and turning with it. An arm 3 is pivoted on the frame 4 of the vehicle and constitutes the fork supporting the wheel 2. The arm 3 carries the pivot axis 5, parallel to the axis of rotation of the disk, of a caliper or support 6 holding the linings mounted so as to rotate about the axis 5 and enclose the disk. The support or caliper 6 holds two linings or friction pads 7 situated one on each side of the disk 1, tending to move away from the axis of rotation of the disk under the action of a spring 12 and capable of making contact with the disk with a force F exerted on each lining by a hydraulic control piston as is well-known. To this end, a hydraulic control pressure furnished by a master cylinder, not shown, is transmitted by means of a brake line 8 to the pistons 9 for clamping the linings 7 against the disk. Following the arrangement of the Figure, the rubbing force of the disk 1 against the linings 7 tends to make the caliper 6 rotate so that the said linings move in toward the axis of rotation of the disk in opposition to the force of the spring 12. Associated with the clamping pistons 9, according to one mode of realization of the brake, is a means of hydraulically controlling the caliper or support 6, such as a piston, in order to regulate its angular positioning about the pivot 5, obtained naturally under the action of the sliding force of the disk in contact with the linings. When braking, the rotation of support 6 is manifested by a radial displacement of the support towards the axis of rotation of the disk and a reduction in the radius of action R of the linings 17. With the aim of controlling the radial displacements of support 6, the latter carries the cylinder 10 for a control piston 11. The piston 11 which receives the braking pressure from the master cylinder pushes against the arm 3 and tends to rotate support 6 about the axis 5 and move the support towards the axis of rotation of the disk. The return spring 12, the ends of which are attached to the support 6 and the arm 3, tends, on the contrary, to return the support to the periphery of the disk. Finally, a pair of stops 13, 14 limit the radial displacements of the support 6. With the aim of adapting support 6 to its low of displacement, the spring 12 can be skewed. It can also possess a variable anchoring point realized, for example, in the form of a collar adjustable along the arm 3, so as to permit different control characteristics of the support when the driver is alone or with a passenger. In practice, the diameter of the pistons 9, the relative position of the support 6 with respect to the axis of rotation of the disk and the stiffness of spring 12 permit regulation of the braking moment $M_R$ in order to make the variations in the braking couple correspond to the transfer of load.

The mechanically controlled disk brake shown in FIG. 4 consists of a disk 401 mounted so as to rotate about an axis 402. The support 406 for the linings or friction pads 407 is made up of two arms, pivoted about a common axis 409 in the manner of scissor blades. An elastic means of return 405, realized in the form of a rubber cushion for example, tends to spread the two arms of support 406 apart so as to unclamp the friction pads. An adjustment 404 permits moving the pads 407 manually or automatically towards the corresponding surfaces of disk 401 as they wear. A cam 408 is interposed between two centering rollers 403 located at the ends of the arms 406a and 406b of the support 406. The cam 408 has two ramps forming a V engaging the rollers 403, and a traction cable 410 anchored at the head of the cam 408 permits drawing on this cam to exert a force against the rollers 403. As a result, the arms 406a and 406b turn on the axis 409 so as to clamp down on the disk 401.

According to FIG. 5 which shows the mode of mounting the brake on the rear wheel of the vehicle, it is seen that the axis 409R combines with a crosspiece forming a second axis 419R, parallel to the axis of rotation of the disk 401R and integral with an oscillating arm 420 of the frame which supports the axis of rotation of the disk 401R.

The arm 420 carries a first projection or stop 421 located near a second projection or stop 422 integral with one of the arms 406a or 406b of the support 406. A second cam 408'R engages the projections 421, 422 with its V-shaped ramps. The cam 408'R is connected to the cam 408R by the traction cable 410 and thus allows the rotation of the support 406 and its linings about the axis 419R when the cams 408 and 408' are subjected to the traction force of the cable. It is seen, then, that the distance between the linings and the axis of rotation of the disk vary along with the clamping force of the linings against the disk.

For returning the support 406 to a radial position corresponding to the maximum radius of action of the linings, one could employ a torsion spring $R_1$ anchored to the axis 419R and the arm 420 as shown in FIG. 7.

Cable 410 goes around a grooved pulley 413 attached to a strap 414 anchoring the brake control cable 415R. The pulley 413 is subjected, in addition, to the action of the return spring of the cams in the position of rest. FIG. 6 shows the mode of mounting the brake of FIG. 4 on the front wheel of the vehicle. The axis of rotation 409A of the arms 406a, 406b of the support is integral here with the fork 416 supporting the front wheel of the vehicle and the control cable 415A is anchored to the head of the cam 408A. Moreover, the friction linings are situated at a fixed distance from the axis of rotation of the wheel.

In FIG. 7, which shows schematically a coordinated control arrangement for the front and rear wheels, it is seen that the different brake-control cams 408'R, 408R for the rear wheel are connected to the front brake control cam 408A by way of cables 415A, 415R. Cables 415A, 415R rest on supports 423 fixed to the vehicle frame and the portion situated between the supports 423 is tied to a means of transmitting the braking force represented by a pedal P and a traction cable C which modifies the deflection of the portion of cable between the supports 423. It can easily be shown that the tractive forces exerted by the cables 415A and 415R on the corresponding cams depend on the value of this deflection and can be amplified in consequence.

By modifying the slope of the ramps of cams 408R, 408'R and the point of attachment of cable C to the span of cable 415 between the supports 423, it is possible to adapt the braking couple to the curve of distribution of braking forces. In the example represented in FIG. 8, a simplified rear brake is used in which the braking control cams have been eliminated. The brake caliper or support 806 here pivots about its axis 819 carried by the arm 820 under the action of the braking couple.

It is quite evident that the disk brake in which the radius of action of the linings is capable of being varied is highly recommended for the rear wheel of a two-wheeled vehicle.

Still, in the case of automobiles with front-wheel drive, the front disk brakes of which are coupled with the transmission, one can likewise envisage, in accordance with the invention, increasing the radius of action of the front linings as a function of the braking force in the rear where the radius of action of the linings is fixed.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A disk brake for vehicles equipped with a system of coordinated braking of the front and rear wheels which comprises:
   a disk brake associated with a wheel of the vehicle and extending from a hub part of said wheel;
   a caliper holder including only a first and second friction pad mounted thereon and disposed one on each side of the disk so as to always contact said disk upon engagement of said friction pads with said disk;
   means for controlling the clamping of the disk between the friction pads;
   means for pivoting the caliper holding the pads onto an element of the vehicle frame, outside the periphery of the disk and parallel to the axis thereof;
   means for controlling the radial displacement of the caliper operatively associated with said pivoting means so as to obtain a variation in the distance between the friction pads and the axis of the disk as a linear function of the clamping force including a cam for controlling the radial displacement of the caliper interposed between the caliper and a frame carrying the caliper; and
   a first and second stop attached to the vehicle frame and the lining holder caliper such that the cam controlling the radial displacement of the caliper is interposed between said first and second stop.

2. A disk brake for vehicles equipped with a system of coordinated braking of the front and rear wheels which comprises:
   a disk brake associated with a wheel of the vehicle and extending from a hub part of said wheel;
   a caliper holder including only a first and second friction pad mounted thereon and disposed one on each side of the disk so as to always contact said disk upon engagement of said friction pads with said disk;
   means for controlling the clamping of the disk between the friction pads;
   means for pivoting the caliper holding the pads onto an element of the vehicle frame, outside the periphery of the disk and parallel to the axis thereof;
   means for controlling the radial displacement of the caliper operatively associated with said pivoting means so as to obtain a variation in the distance between the friction pads and the axis of the disk as a linear function of the clamping force including a cam for controlling the radial displacement of the caliper interposed between the caliper and a frame carrying the caliper;
   wherein the cam controlling the radial displacement of the caliper is operatively associated with a second cam controlling the clamping of the pads on the brake disk and that each of said cams are connected by means for transmitting braking force to said brake.

3. A disk as set forth in claim 2, wherein:
   the means of transmitting braking force of the cam controlling the radial displacement of the caliper and to the second cam controlling the clamping of the pads on the disk comprise a return system and a traction cable anchored to said return system on which acts at least one opposing spring member for returning said cams to their position of rest.

4. A disk as set forth in claim 3, wherein:
   the ends of the traction cable are secured to means of controlling the front and rear brakes of the vehicle and further comprises a tractive device anchored between the ends of the said cable so as to modify the deflection of said cable between two cable supports and, consequently, the traction forces on its ends.

* * * * *